(12) United States Patent
Stockton

(10) Patent No.: US 9,799,241 B2
(45) Date of Patent: Oct. 24, 2017

(54) STOP SIGN BRAKE LIGHT

(71) Applicant: William Carl Stockton, Panama City, FL (US)

(72) Inventor: William Carl Stockton, Panama City, FL (US)

( * ) Notice: Subject to any disclaimer, the term of this patent is extended or adjusted under 35 U.S.C. 154(b) by 0 days.

(21) Appl. No.: 14/807,342

(22) Filed: Jul. 23, 2015

(65) Prior Publication Data

US 2016/0027350 A1    Jan. 28, 2016

Related U.S. Application Data

(60) Provisional application No. 62/028,597, filed on Jul. 24, 2014.

(51) Int. Cl.

| G09F 13/22 | (2006.01) |
|---|---|
| G09F 13/00 | (2006.01) |
| G09F 13/16 | (2006.01) |
| G09F 21/04 | (2006.01) |
| B60Q 1/44 | (2006.01) |
| B60Q 1/26 | (2006.01) |
| G09F 13/04 | (2006.01) |

(52) U.S. Cl.
CPC ........... G09F 13/005 (2013.01); B60Q 1/268 (2013.01); B60Q 1/44 (2013.01); G09F 13/16 (2013.01); G09F 21/04 (2013.01); *G09F 2013/044* (2013.01); *G09F 2013/222* (2013.01)

(58) Field of Classification Search
CPC .......... B60Q 1/50; B60Q 1/302; B60Q 1/503; B60Q 1/52; B60Q 1/2607; B60Q 1/2611; B60Q 1/268; G09F 21/04; G09F 13/16; G09F 13/005; G09F 13/14
USPC ............................................................ 40/544
See application file for complete search history.

(56) References Cited

U.S. PATENT DOCUMENTS

| 4,121,844 | A | * | 10/1978 | Nemoto | F16C 11/0671 |
|---|---|---|---|---|---|
| | | | | | 277/635 |
| 4,420,898 | A | * | 12/1983 | Moses | G08B 7/062 |
| | | | | | 40/544 |
| 4,607,444 | A | * | 8/1986 | Foster | G09F 13/28 |
| | | | | | 116/28 R |
| 4,682,146 | A | * | 7/1987 | Friedman, III | B60Q 1/302 |
| | | | | | 116/42 |
| 5,016,145 | A | * | 5/1991 | Singleton | B60Q 1/503 |
| | | | | | 362/223 |
| 5,103,205 | A | * | 4/1992 | Halligan | B60Q 7/00 |
| | | | | | 116/48 |
| D374,191 | S | * | 10/1996 | Terrebonne | D10/114.3 |
| 5,652,565 | A | * | 7/1997 | Salcedas | B60Q 1/302 |
| | | | | | 340/467 |
| 5,751,212 | A | * | 5/1998 | Findley | B60Q 1/50 |
| | | | | | 116/63 P |
| 5,819,455 | A | * | 10/1998 | Tsuda | G09F 9/33 |
| | | | | | 40/550 |

(Continued)

*Primary Examiner* — Shin Kim
(74) *Attorney, Agent, or Firm* — Jason T. Daniel, Esq.; Daniel Law Offices, P.A.

(57) ABSTRACT

A stop sign brake light for vehicles includes a main body having an octagonal shape, a reflective border and the word STOP that is positioned along the center of the main body. A plurality of lighted elements are along an entirety of the reflective border and the word STOP, and a controller having a wiring harness for connecting to a vehicle power source.

14 Claims, 3 Drawing Sheets

(56) References Cited

U.S. PATENT DOCUMENTS

| | | | | |
|---|---|---|---|---|
| 5,825,281 A * | 10/1998 | McCreary | B60Q 1/2611 | 340/425.5 |
| 5,905,434 A * | 5/1999 | Steffan | B60Q 1/50 | 116/28 R |
| 6,177,866 B1 * | 1/2001 | O'Connell | B60Q 1/50 | 340/463 |
| 6,789,339 B2 * | 9/2004 | Blease | G09F 21/04 | 362/503 |
| 6,799,877 B2 * | 10/2004 | Watkins | B60Q 1/56 | 362/497 |
| 6,867,692 B2 * | 3/2005 | Weatherspoon | B60Q 1/503 | 315/77 |
| 6,907,685 B1 * | 6/2005 | Falkner | B60Q 1/2615 | 40/552 |
| 7,178,279 B2 * | 2/2007 | Molvidson | G09F 13/16 | 362/812 |
| 7,343,704 B1 * | 3/2008 | Wilson | G09F 9/305 | 40/547 |
| 7,575,349 B2 * | 8/2009 | Bucher | B60Q 1/302 | 362/231 |
| 7,641,516 B1 * | 1/2010 | Scott | H01R 13/2471 | 439/607.12 |
| 7,696,865 B1 * | 4/2010 | Robinson | B60Q 1/503 | 340/472 |
| 7,788,833 B2 * | 9/2010 | Hauck | B60Q 1/2607 | 315/185 S |
| 7,834,752 B2 * | 11/2010 | Kuvantrarai | B60Q 1/44 | 340/468 |
| 2004/0062032 A1 * | 4/2004 | Mass | A41D 13/01 | 362/84 |
| 2004/0104810 A1 * | 6/2004 | Scott | G08B 5/006 | 340/321 |
| 2006/0225327 A1 * | 10/2006 | Peters | G09F 9/305 | 40/547 |
| 2007/0193085 A1 * | 8/2007 | Sullivan | B60Q 1/302 | 40/443 |
| 2009/0255157 A1 * | 10/2009 | Kim | B60R 13/00 | 40/546 |
| 2009/0320340 A1 * | 12/2009 | Koren | G09F 13/22 | 40/544 |
| 2014/0196328 A1 * | 7/2014 | Swartz | G02B 6/006 | 40/546 |
| 2015/0356894 A1 * | 12/2015 | Petrocy | G09F 13/005 | 40/545 |
| 2016/0027350 A1 * | 1/2016 | Stockton | G09F 13/005 | 40/544 |

* cited by examiner

STOP SIGN BRAKE LIGHT

CROSS-REFERENCE TO RELATED APPLICATIONS

This application claims the benefit of U.S. Application Ser. No. 62/028,597 filed on Jul. 24, 2015, the contents of which are incorporated herein by reference.

TECHNICAL FIELD

The present invention relates to the field of vehicle safety devices, and more particularly, to a stop sign brake light for use within vehicles.

BACKGROUND

The statements in this section merely provide background information related to the present disclosure and may not constitute prior art.

It is universally recognized that it is desirable to provide visual signaling devices within motor vehicles for the purpose of notifying other drivers when a particular vehicle is going to slow down or come to a complete stop. To this end, modern automobiles are provided with one or more brake lights which illuminate when the driver applies the brakes of the automobile.

Owing to the vast array of different vehicle manufacturers and models that are on the road today, there does not exist any real consistency with regard to the size, shape and/or location of vehicle brake light(s) from one vehicle to another. In this regard, automotive engineers and safety experts have previously recognized that drivers, especially those who are distracted, overly tired and/or under the influence of alcohol, for example, may not always immediately recognize and react to the illuminated brake lights of a vehicle in front of them.

Although some efforts have previously been made to design electrical systems which will permit the brake lights to flash intermittently while the vehicle is braking, these efforts have largely been unsuccessful owing to the increased complexity of the required electrical systems, and the increased costs to manufacturers.

Through research and development, the present inventor has discovered a means by which a vehicle brake light can be incorporated into a universally recognized symbol which can solve the above noted issues. Accordingly, it would be beneficial to provide a stop sign brake light as described below.

SUMMARY OF THE INVENTION

The present invention is directed to a stop sign brake light for vehicles. One embodiment of the present invention can include a main body having an octagonal shape, a reflective border and the word STOP that is positioned along the center thereof. A plurality of lighted elements is disposed throughout the main body, and function to illuminate one or both of the border and the STOP upon being activated by the vehicle brakes.

In another embodiment, the device can further include a controller and wiring harness that is in communication with the vehicle braking system. The harness receiving DC power from the vehicle brakes and supplying the same to the controller for activation of the lighted elements. The device can also include one or more connection units for securing the device onto a vehicle window or other location that is viewable by other drivers.

In yet another embodiment of the present invention, the device can include functionality for flashing the lighted elements and/or displaying multiple colors.

This summary is provided merely to introduce certain concepts and not to identify key or essential features of the claimed subject matter.

BRIEF DESCRIPTION OF THE DRAWINGS

Presently preferred embodiments are shown in the drawings. It should be appreciated, however, that the invention is not limited to the precise arrangements and instrumentalities shown.

DETAILED DESCRIPTION OF THE INVENTION

Figure 1:
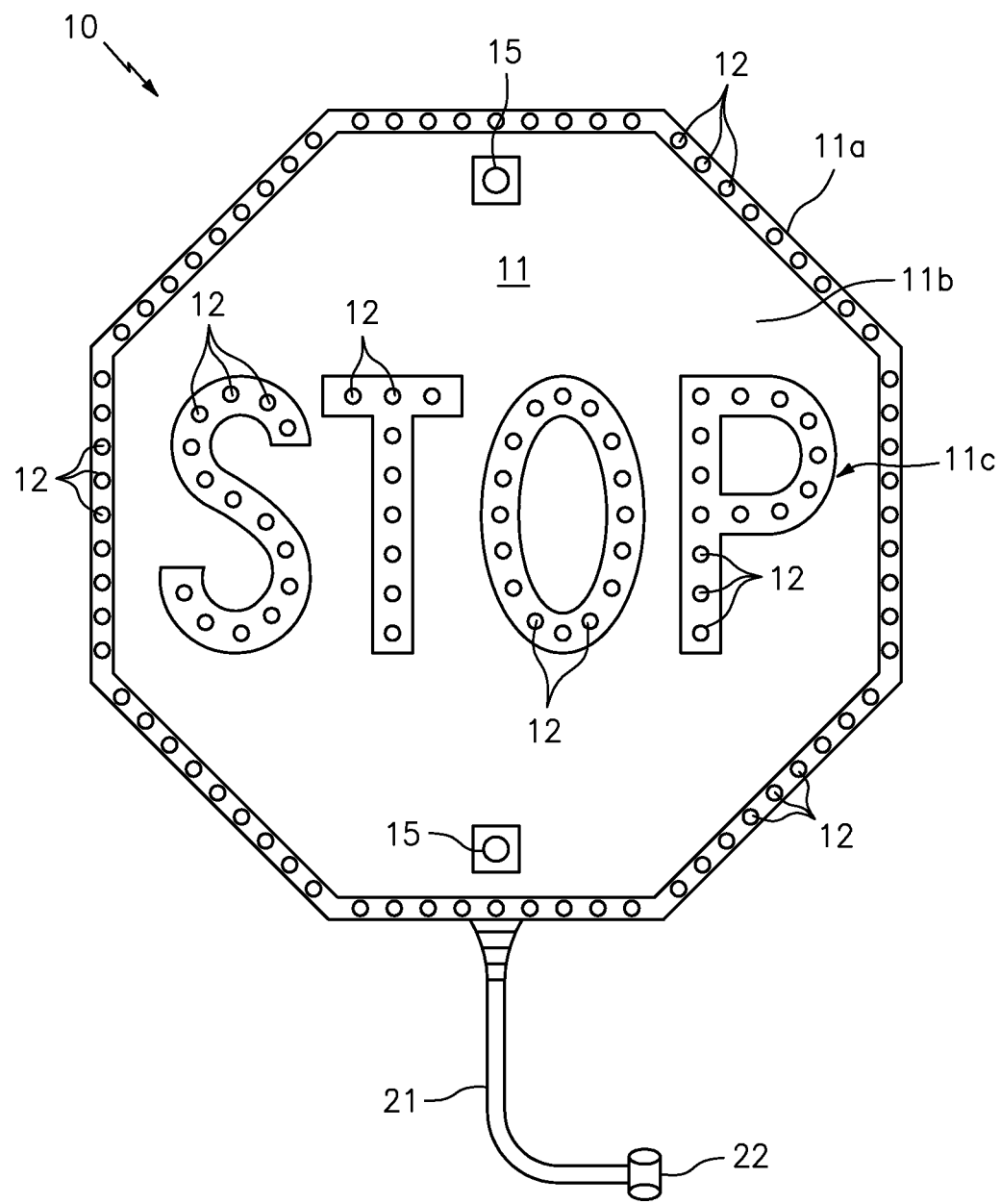
FIG. 1 is a front view of the stop sign brake light device that is useful for understanding the inventive concepts disclosed herein.

While the specification concludes with claims defining the features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention which can be embodied in various forms. Therefore, specific structural and functional details disclosed herein are not to be interpreted as limiting, but merely as a basis for the claims and as a representative basis for teaching one skilled in the art to variously employ the inventive arrangements in virtually any appropriately detailed structure. Further, the terms and phrases used herein are not intended to be limiting but rather to provide an understandable description of the invention.

Identical reference numerals are used for like elements of the invention or elements of like function. For the sake of clarity, only those reference numerals are shown in the individual figures which are necessary for the description of the respective figure. For purposes of this description, the terms "upper," "bottom," "right," "left," "front," "vertical," "horizontal," and derivatives thereof shall relate to the invention as oriented in FIG. 1.

FIG. 1 illustrates one embodiment of a stop sign brake light 10 that is useful for understanding the inventive concepts disclosed herein.

As shown, the device 10 can include a generally octagonal-shaped main body 11 that is constructed from a lightweight material such as injection molded plastic, for example. In the preferred embodiment, a red border 11a, can extend about the periphery of the main body, and the word "STOP" 11c can be positioned in bold red letters along the central portion of the main body 11b.

Elements 11a and 11c can be integrated into the construction of the main body itself utilizing known construction methodologies, or can be formed from any number of secondary material such as paint, reflective tape, and other such elements, for example. In either instance, the completed body forms the universally and immediately recognizable stop sign.

The device can illuminate when a user activates their vehicle brake lights. As such, the device can further include a series of lighted elements 12 that are embedded within or upon the surface of the main body 11. In the preferred embodiment, the lighted elements can include a plurality of DC-powered light-emitting diodes (LED's) that are positioned along one or both of the word "STOP" 11c and the outer border 11b. The lighted elements can preferably emit red light, however other embodiments are contemplated wherein the lights can fluctuate across multiple different colors (i.e., red, green, orange, yellow, etc.). Upon being activated, the lights can remain in a constant state of illumination, or can flash, so as to better attract the attention of nearby drivers.

Figure 2:
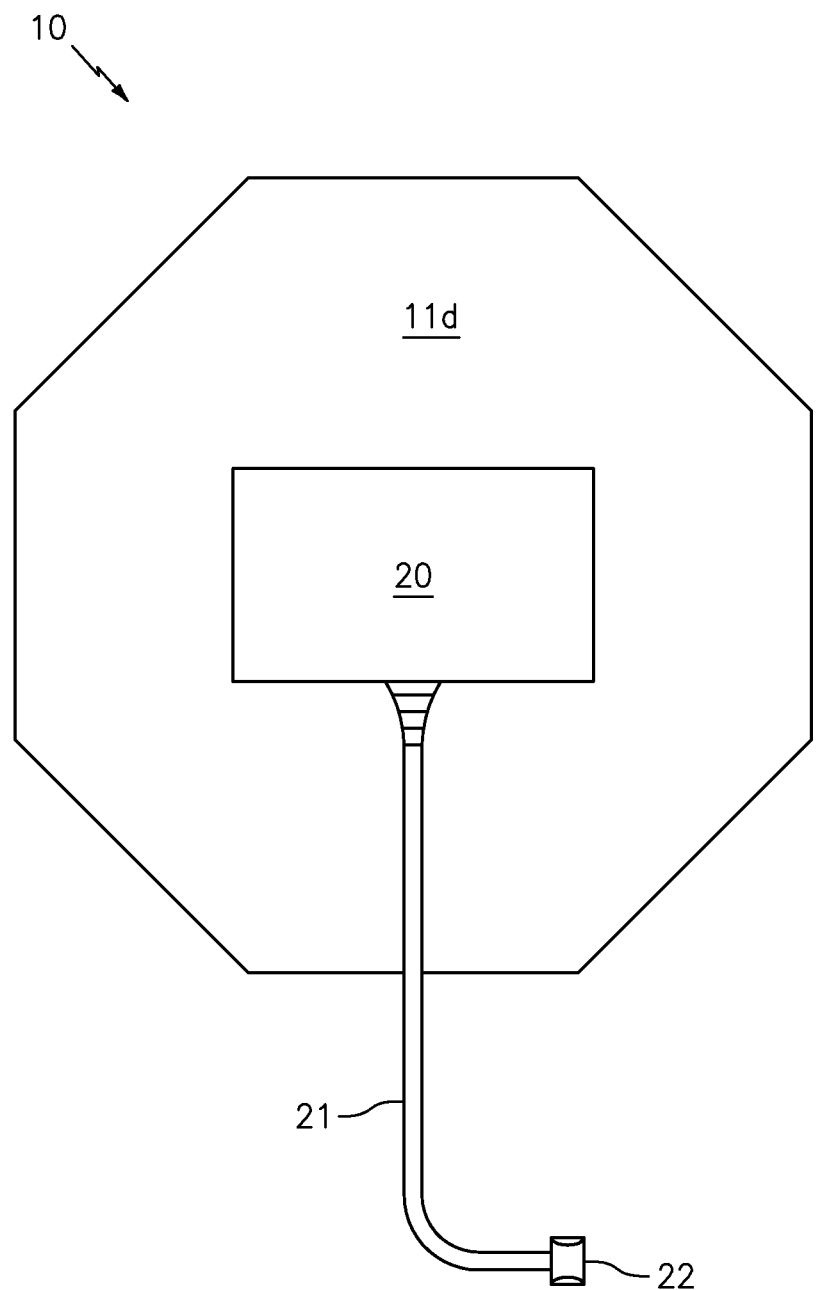
FIG. 2 is a back side view of the stop sign brake light device in accordance with one embodiment of the invention.

As shown in FIG. 2, a controller 20 can be positioned along the rear facing side 11d of the main body. The controller can function to communicate with the electrical system of a vehicle (not shown) and can activate the lighted elements 12 of the device. The controller can also include circuitry for enabling the lights to change color, remain illuminated, and/or to perform various patterns such as a flashing or chase pattern, for example. Circuitry for performing such features is well known in the art, and can be integrated into the construction of the controller via a microchip imprinted onto a circuit board, for example.

The controller 20 can further include a wiring harness 21 having an electrical connector 22 such as a wire splice, for example, along a distal end. The connector can function to engage a vehicles' brake light wiring, so as to receive power when a user steps on the vehicle brakes. At this time, the DC power can be transmitted through the wiring harness 21 to the controller 20 for use in illuminating the lighted elements 12.

Figure 3:
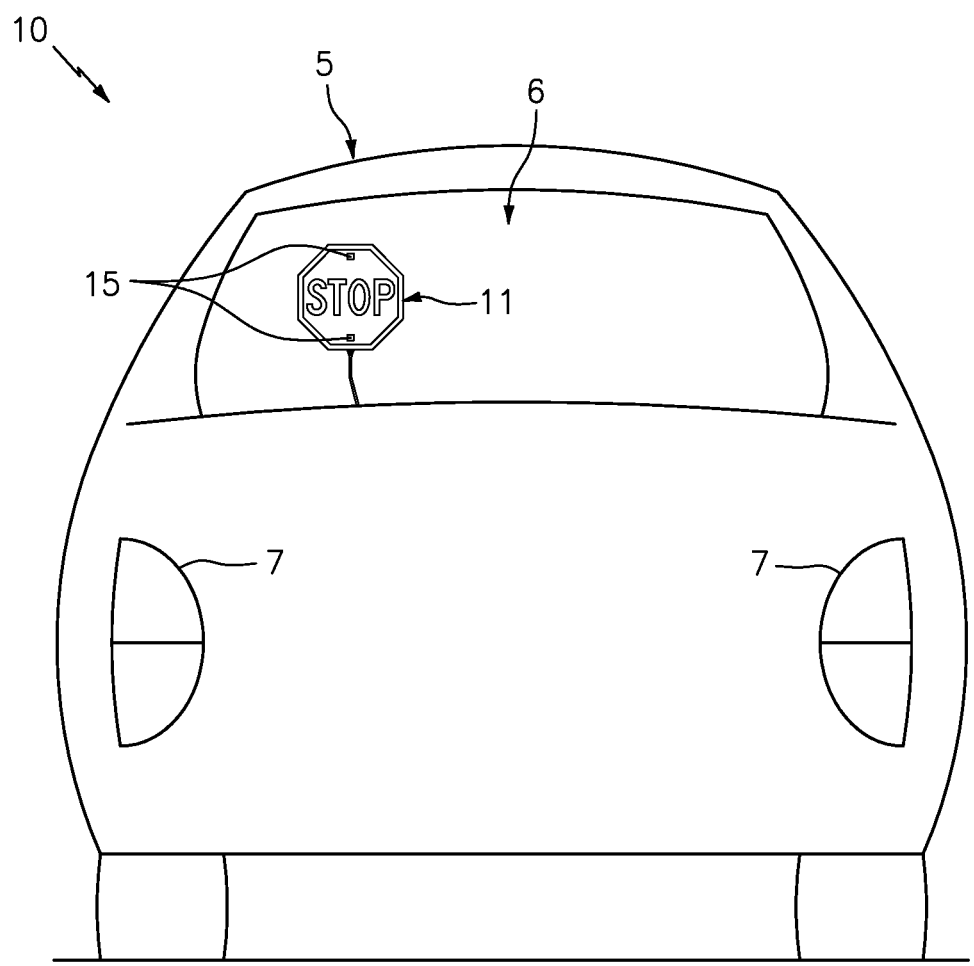
FIG. 3 is a perspective view of the stop sign brake light device in operation, in accordance with one embodiment of the invention.

FIG. 3 illustrates one embodiment of the device 10 in operation. As shown, the device 10 can preferably be positioned in a highly visible portion of a vehicle 5, such as the rear window 6. The wiring harness can be connected to the vehicle brake light(s) 7 as described above, and the main body 11 can be secured to the vehicle window utilizing any number of connection units 15 such as, for example, suction cups and/or adhesives.

As such, once the wiring harness has been connected, the device 10 can be powered solely from the vehicle itself, and the lighted elements of the device will always illuminate whenever the vehicle brakes are applied, thereby providing an immediately recognizable indication to other drivers that the vehicle is slowing or stopping.

Although dimensions are not critical, it is contemplated that multiple sized devices can be constructed, based on the type of vehicle into which the device is to be used. For example, octagonal dimensions of approximately 8"×8" for use on motorcycles and passenger vehicles; octagonal dimensions of approximately 16"×16" and 24"×24" for use on recreational vehicles such as Motor homes and travel trailers; and octagonal dimensions of approximately 48"×48" for use on commercial vehicles such as semi-trucks, dump trucks and box trucks, for example. Of course, the invention is not to be construed as limiting to these particular sizes or uses, as any number of other shapes, sizes and uses are also contemplated.

Moreover, although described above as an aftermarket product, other embodiments are also contemplated. For example, the device 10 can be included in the new construction of automobiles, wherein the main body can be positioned within the vehicle body and/or frame so as to be visible to other drivers.

By providing a visual aid which can display a universally recognizable STOP sign, symbol and word along a vehicle that is slowing or stopping, the inventor has provided a novel means for quickly and universally attracting the attention of other vehicle drivers, and alerting them to slow down. Because stop signs are among the very first road warning signs drivers are taught to recognize, it is believed that the presence of an illuminated stop sign will be more easily recognizable to regular, as well as impaired drivers, and may serve to prevent many automobile accidents and save countless lives in the process.

Although described above as including particular sizes, colors and features, the inventive concepts are not limited to any particular size, color, shape, language, or construction material. In this regard, the device 10 can be provided in any number of different colors, shapes and languages, so as to be recognizable in a variety of different countries.

In addition to the above, other embodiments are also contemplated wherein the brightness of the device 10 changes based on the speed at which the vehicle is stopping. For example, the controller circuitry can also include functionality that will activate the lighted elements 12 at a reduced level, such as 50 percent, for example, when the vehicle is slowing at an average rate, and can also include functionality that will activate the lighted elements of the stop sign at 100 percent and/or flash the lights, when the vehicle is slowing at higher rate of speed. Such features being accomplished through the use of an accelerometer or other such hardware which can be positioned within the controller 20.

In addition to the above, the front surface 11b of the main body 11 and/or elements 11a and 11c can also be coated with a phosphorescent material so as to glow in the dark. Such a feature can be beneficial in instances where the vehicle is parked on a street in an unlit area, as it can attract the attention of a driver and prevent that driver from impacting the parked car. Moreover, it is important that the phosphorescent material not be provided along the back surface of the main body 11d, so as to ensure the driver of the vehicle in which the device is located is not distracted while driving at night.

As described herein, one or more elements of the stop sign brake light device 10 can be secured together utilizing any number of known attachment means such as, for example, screws, glue, compression fittings and welds, among others. Moreover, although the above embodiments have been described as including separate individual elements, the inventive concepts disclosed herein are not so limiting. To this end, one of skill in the art will recognize that one or more individual elements may be formed together as one continuous element, either through manufacturing processes, such as welding, casting, or molding, or through the use of a singular piece of material milled or machined with the aforementioned components forming identifiable sections thereof.

As to a further description of the manner and use of the present invention, the same should be apparent from the above description. Accordingly, no further discussion relating to the manner of usage and operation will be provided.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A vehicular stop sign brake light device, consisting of:
   a compact octagonal-shaped main body;
   a border that is disposed along a periphery of the main body;
   a word STOP that is positioned along a central portion of the main body;
   a plurality of lighted elements that are disposed along an entirety of the border and the word STOP;
   a connector that is configured to secure the main body onto an inside portion of a motor vehicle;
   a wiring harness that is configured to be permanently connected to an electrical system of the motor vehicle to which the main body is secured; and
   a controller that is in communication with each of the wiring harness and the plurality of lighted elements said controller including an integrated accelerometer that is configured to independently detect a rate at which the motor vehicle is slowing, and to selectively adjust an illumination level of the plurality of lighted elements based upon the detected rate.

2. The device of claim 1, wherein each of the border and the word STOP include a red color.

3. The device of claim 1, wherein the border is coated with a reflective material.

4. The device of claim 1, wherein the word STOP is coated with a reflective material.

5. The device of claim 1, wherein each of the lighted elements include a light emitting diode.

6. The device of claim 1, wherein the plurality of lighted elements generate red light.

7. The device of claim 1, wherein the plurality of lighted elements generate at least two different colors of light.

8. The device of claim 1, wherein the controller further includes functionality for causing one or more of the plurality of lighted elements to blink.

9. The device of claim 1, wherein the controller further includes functionality for causing two or more of the plurality of lighted elements to light in a pattern.

10. The device of claim 1, wherein the compact main body comprises a dimension of approximately 8"×8" for use on at least one of a motorcycle and a passenger vehicle.

11. The device of claim 1, wherein the compact main body comprises a dimension of between approximately 16"×16" and 24"×24" for use on a recreational vehicle.

12. The device of claim 1, wherein the compact main body comprises a dimension of approximately 48"×48" for use on a commercial vehicle.

13. The device of claim 1, wherein the word STOP and the border are coated with a phosphorescent material.

14. The device of claim 1, wherein the main body is constructed from lightweight plastic, and further including a connector that is configured to secure the main body onto a window of the vehicle.

* * * * *